(12) United States Patent
Keenan et al.

(10) Patent No.: US 11,014,450 B2
(45) Date of Patent: May 25, 2021

(54) STALK MOUNTED TELESCOPING ROTARY SHIFT KNOB

(71) Applicant: Ford Global Technologies, LLC, Dearborn, MI (US)

(72) Inventors: Jason Keenan, Dearborn, MI (US); Angelo Patrick Bastianelli, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 322 days.

(21) Appl. No.: 15/871,737

(22) Filed: Jan. 15, 2018

(65) Prior Publication Data
US 2018/0244155 A1 Aug. 30, 2018

Related U.S. Application Data

(60) Provisional application No. 62/463,453, filed on Feb. 24, 2017.

(51) Int. Cl.
*B60K 37/00* (2006.01)
*B60K 37/06* (2006.01)
(Continued)

(52) U.S. Cl.
CPC .............. *B60K 37/06* (2013.01); *B60K 20/06* (2013.01); *F16H 59/02* (2013.01); *F16H 59/08* (2013.01);
(Continued)

(58) Field of Classification Search
CPC .. B60K 37/06; B60K 2350/102; B60K 20/06; B60K 2370/782; F16H 59/02; F16H 59/08; F16H 61/24; F16H 59/12
See application file for complete search history.

(56) References Cited

U.S. PATENT DOCUMENTS 5,156,243 A * 10/1992 Aoki ...................... B60K 20/06
192/218
5,442,974 A * 8/1995 Sugimoto .............. B60K 37/06
74/335
(Continued)

FOREIGN PATENT DOCUMENTS

CN 2625193 Y 7/2004
CN 201769688 U 3/2011
(Continued)

OTHER PUBLICATIONS

Current Rotary eShifters, 1 page.
BMW i3 eShifter, 1 page.
Mercedes Benz Stalk Style eShifter, 2 pages.

*Primary Examiner* — Zakaria Elahmadi
(74) *Attorney, Agent, or Firm* — Vincent Mastrogiacomo; Brooks Kushman P.C.

(57) ABSTRACT

A rotary shift knob having a telescopic structure including a knob and a housing that are secured together to move axially and pivotally relative to each other within a limited range in either direction. The knob and housing are moved axially relative to each other to shift into the park position from the other positions. The inner and outer members are pivoted relative to each other to shift between reverse, neutral and drive positions. The knob is connected by a shaft to a piston that moves within a cavity defined by the housing.

8 Claims, 4 Drawing Sheets

(51) Int. Cl.
  *F16H 59/02* (2006.01)
  *F16H 61/24* (2006.01)
  *F16H 59/08* (2006.01)
  *B60K 20/06* (2006.01)
  *F16H 59/12* (2006.01)

(52) U.S. Cl.
  CPC ........ *F16H 61/24* (2013.01); *B60K 2370/126* (2019.05); *B60K 2370/782* (2019.05); *F16H 59/12* (2013.01); *F16H 2059/081* (2013.01); *F16H 2061/243* (2013.01)

(56) References Cited

U.S. PATENT DOCUMENTS

| | | | |
|---|---|---|---|
| 5,617,929 | A | 4/1997 | Richardson et al. |
| 6,253,869 | B1 | 7/2001 | Wilson et al. |
| 6,360,624 | B1* | 3/2002 | Sedlmaier ........... F16H 59/0204 74/335 |
| 6,378,393 | B1* | 4/2002 | Bates ...................... F16H 59/02 74/473.18 |
| 6,736,438 | B1 | 5/2004 | Wieclawski |
| 6,945,349 | B2 | 9/2005 | Colling et al. |
| 9,522,596 | B2* | 12/2016 | Lindner ................. B60K 20/06 |
| 10,309,525 | B2* | 6/2019 | Heo ........................ F16H 59/08 |
| 2001/0024478 | A1 | 9/2001 | Sasada |
| 2002/0139602 | A1 | 10/2002 | Okanda |
| 2003/0029261 | A1* | 2/2003 | DeJonge ................ B60K 37/06 74/335 |
| 2003/0155786 | A1 | 8/2003 | Kim et al. |
| 2004/0107790 | A1* | 6/2004 | Maeda ................... B60K 37/06 74/484 R |
| 2004/0110600 | A1* | 6/2004 | Sekino ................... B60K 20/06 477/99 |
| 2006/0037424 | A1* | 2/2006 | Pickering ............... B60K 37/06 74/473.3 |
| 2007/0016448 | A1 | 1/2007 | Brown |
| 2007/0176448 | A1 | 8/2007 | Spykerman et al. |
| 2010/0090491 | A1 | 4/2010 | Hipshier et al. |
| 2010/0244478 | A1 | 9/2010 | DePue |
| 2013/0163226 | A1* | 6/2013 | Chen ...................... B60K 37/06 362/85 |
| 2013/0313086 | A1* | 11/2013 | Redwood ................ F16H 59/02 200/61.88 |
| 2014/0284957 | A1 | 9/2014 | Duenas et al. |
| 2014/0345409 | A1 | 11/2014 | Watanabe |
| 2014/0346802 | A1 | 11/2014 | Horton et al. |
| 2015/0167827 | A1* | 6/2015 | Fett ........................ F16H 59/08 74/473.3 |
| 2015/0258923 | A1 | 9/2015 | Skapof et al. |
| 2016/0176290 | A1 | 6/2016 | Quijano |
| 2018/0039297 | A1* | 2/2018 | Hessel ..................... G05G 1/08 |
| 2018/0239385 | A1* | 8/2018 | Mizukami ............... F16H 59/08 |
| 2018/0320780 | A1* | 11/2018 | Heo ........................ F16H 59/02 |

FOREIGN PATENT DOCUMENTS

| | | |
|---|---|---|
| DE | 102015210541 A1 | 12/2016 |
| JP | 2000272372 A | 10/2000 |

\* cited by examiner

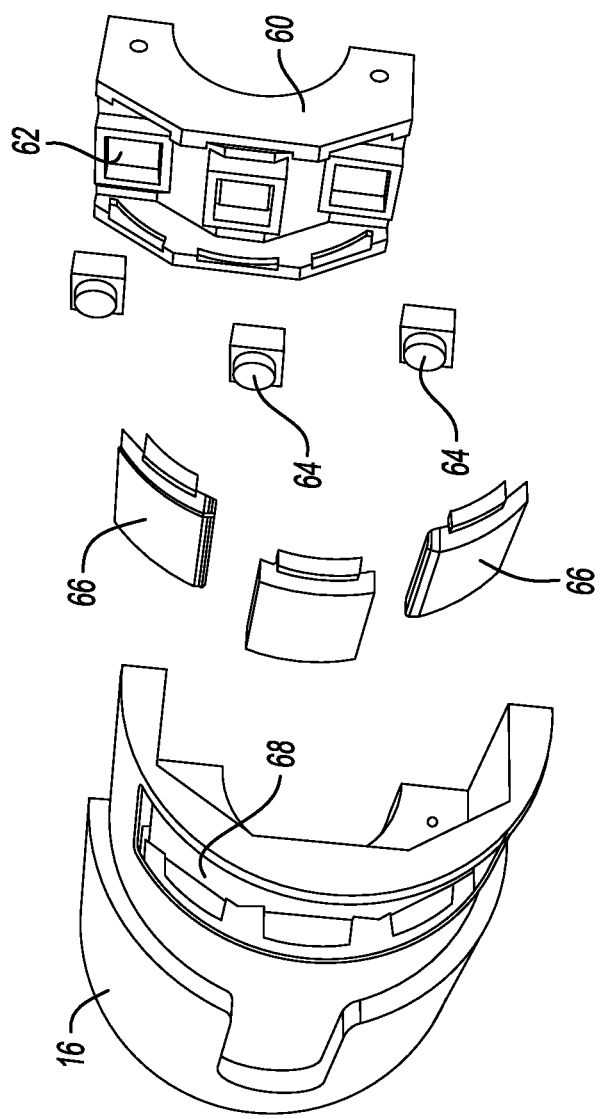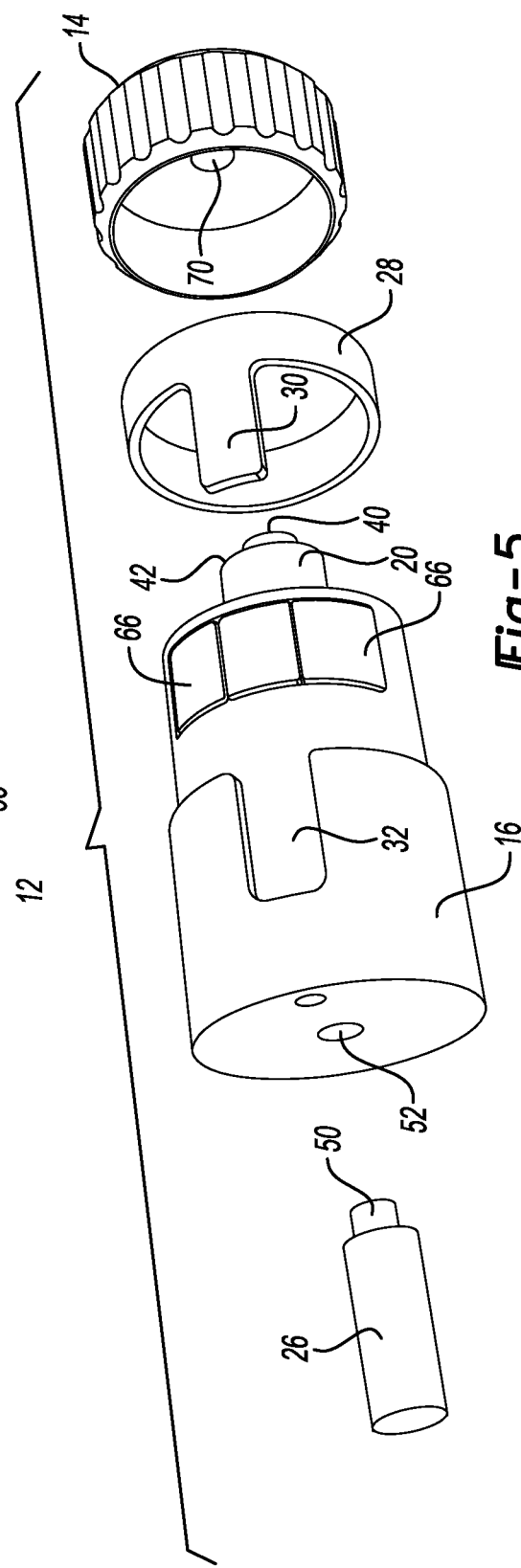

STALK MOUNTED TELESCOPING ROTARY SHIFT KNOB

REFERENCE TO RELATED APPLICATIONS

This application claims the benefit of U.S. provisional application Ser. No. 62/463,453 filed Feb. 24, 2017, the disclosure of which is hereby incorporated in its entirety by reference herein.

TECHNICAL FIELD

This disclosure relates to a shift knob attached with a stalk to a steering column for electronically shifting a transmission of a vehicle.

BACKGROUND

Conventional shift lever controls generally follow a pattern of Park-Reverse-Neutral-Drive-Low (hereinafter "PRNDL") shift sequence. In this sequence, the park position is one position counter-clockwise from the reverse position and the shifter may be easily over rotated into the park position when trying to shift into reverse. To shift from the drive position into the park position the shifter must be moved through the reverse and neutral positions. With prior art mechanical shift linkages, the spacing between shift positions reduces the likelihood of improperly positioning the shift lever. However, with electronic rotary knob shifter lever controls, the spacing between rotary positions increases the likelihood of improperly positioning the knob.

The rotary motion about a rotational axis used to select the park position with some prior art rotary shift knobs is the same as the rotary motion used to place the knob in the reverse, neutral or drive positions. It is difficult to tactilely feel that the park position has been selected. The only way to verify the transmission state is by looking at an illuminated indicator on the knob or by looking at a secondary gauge display on the instrument panel.

Trucks, particularly when used for snow plowing and for other tasks requiring repeated shifting between forward and reverse, require a robust shift lever control that is ergonomically designed to resist accidentally shifting into park. Accidentally shifting into park causes excessive stress on the transmission and an undesirable jarring motion felt by the vehicle's passengers.

This disclosure is directed to solving the above problems and other problems as summarized below.

SUMMARY

The disclosed rotary shift knob features a telescoping structure including a knob and a housing that are assembled together telescopically. The knob and housing axially move and circumferentially pivot relative to each other within a limited range. The knob and housing are moved axially relative to each other to shift into the park position from the other positions. The inner and outer members are circumferentially pivoted relative to each other about a pivot axis of the knob—clockwise and counterclockwise—to shift between reverse, neutral and drive positions.

The disclosed rotary shift knob provides a unique tactile sensation and distinct axial motion when moving into and out of the park position that more clearly indicates to a driver that the transmission is in the park position. This arrangement precludes or minimizes inadvertent shifting into the park position. In addition, the shifter may be moved into park from reverse, neutral or drive directly, provided that the vehicle has come to a stop and the brake is applied as required by vehicle safety standards.

According to other aspects of this disclosure, the rotary shift knob may further comprise a position indicator attached to one of the knob and housing and a plurality of shift position indicia provided on the other of the knob and housing. The knob and housing are axially moved relative to each other to shift into and out of park. The knob and housing are pivoted relative to each other to shift between reverse, neutral and drive state positions. A manual shift switch mechanism may be provided on one of the inner and outer members for selectively shifting between different drive gear ratios.

According to another aspect of this disclosure, a rotary shift knob may be attached to a shaft that is, in turn, attached to a piston. A housing is connected by a stalk to a steering column. The housing defines a cavity that is adapted to receive the piston. A cylindrical bore is defined by the housing that extends from the cavity to a distal end of the housing and is adapted to receive the shaft that connects the shift knob to the piston.

According to other aspects of this disclosure, a rotary shift knob is disclosed that comprises a follower provided on one of the knob and housing and a guide provided on the other of the knob and housing that is engaged by the follower to limit pivotal and axial movement relative to each other. A manual shift switch mechanism may be provided on one of the knob and housing for selectively shifting between different drive gear ratios.

According to another aspect of this disclosure, a shifter is disclosed that comprises a body defining an internal cavity and an axial opening extending from the cavity to one side of the body. A knob assembly includes a knob and a piston connected by a shaft. The piston is disposed inside the cavity, the shaft is disposed in the axial opening, and the knob is disposed outside the body. A track and a follower operate to guide movement of the knob assembly relative to the body. The follower moves within the track allowing the knob assembly to pivot about an axis and move along the axis. A set of electrical contacts each corresponding to one of a plurality of shift positions and a contactor are operative to change a transmission selection when the contactor contacts one of the contacts.

The set of contacts may include a drive contact, a neutral contact, a reverse contact and a park contact. The drive, neutral, and reverse contacts are circumferentially aligned and the park contact is axially offset and circumferentially centered relative to the drive contact and reverse contact.

The knob may be pivoted in one rotary direction to move into drive and in the opposite rotary direction to move into reverse. The knob is moved toward the body of the shifter in the axial direction to move into park.

A manual shift switch may be disposed on the knob that is accessible when the knob is moved axially away from the body.

The above aspects of this disclosure and other aspects will be described below with reference to the attached drawings.

BRIEF DESCRIPTION OF THE DRAWINGS

FIG. 4 is an exploded perspective view of the manual shift switch assembly portion of FIG. 3.

FIG. 5 is an exploded perspective view of the rotary shift knob of FIG. 3 shown partially assembled.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
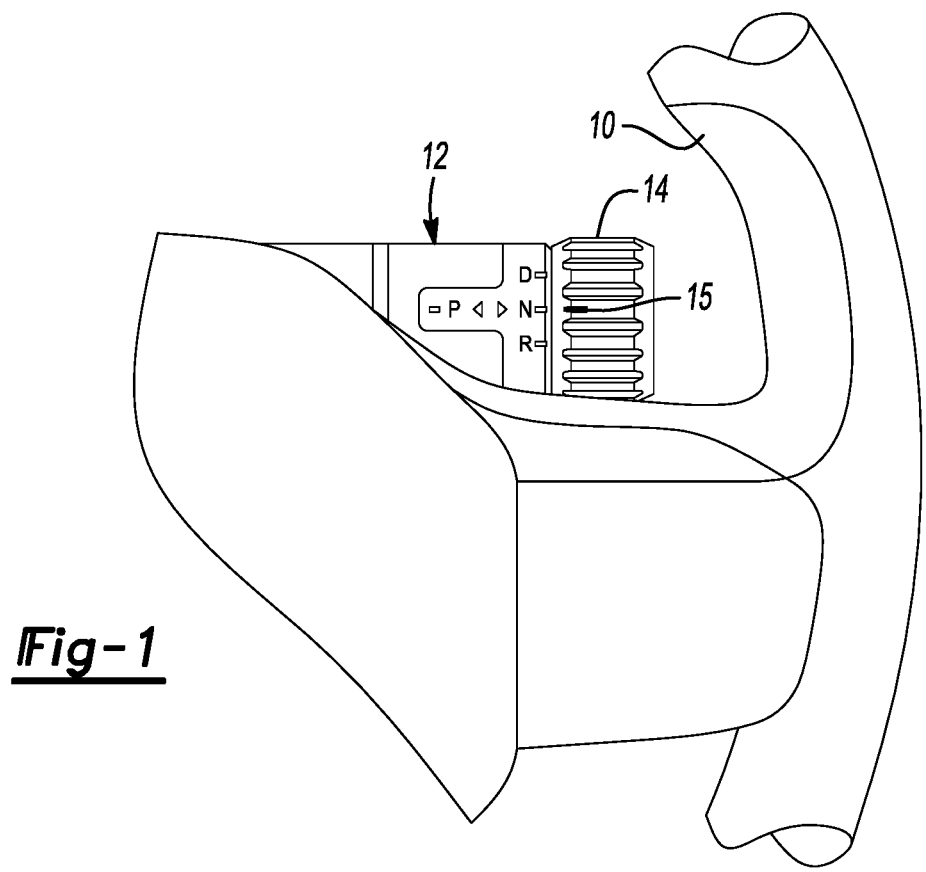
FIG. 1 is a fragmentary elevation view of a steering wheel with a rotary shift knob in park position made according to one embodiment of this disclosure.
Figure 2:
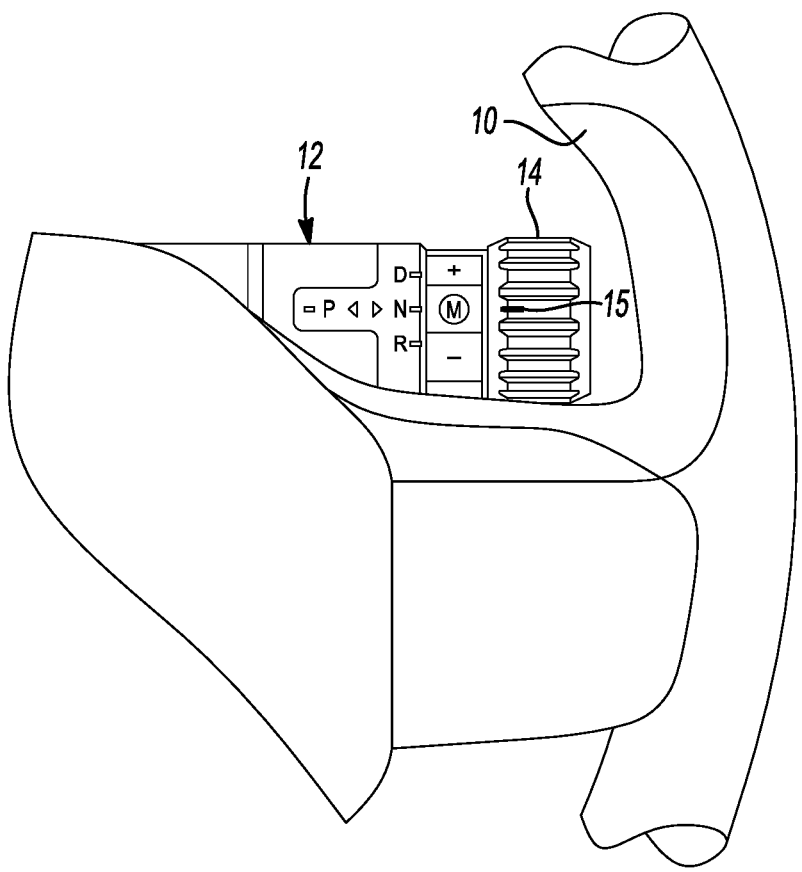
FIG. 2 is a fragmentary elevation view of a steering wheel with a rotary shift knob in neutral position made according to the embodiment of FIG. 1.

Referring to FIGS. 1 and 2, a steering wheel 10 is shown with a rotary shift knob assembly 12. A knob 14 is shown in the park position in FIG. 1 with the knob 14 moved to the left as shown, or towards the center of the steering wheel 10. The knob 14 is shown in the neutral position in FIG. 2 with the knob moved to the right, or axially outwardly relative to the center of the steering wheel 10. The knob 14 is pivoted clockwise from the position shown in FIG. 2 to shift to the drive position. The knob 14 is pivoted counterclockwise from the position shown in FIG. 2 to the reverse position. The knob 14 is shifted to the right when in the neutral, drive, or reverse positions as compared to the park position shown in FIG. 1.

The rotary shift knob assembly 12 includes a knob 14 that is oriented to be grasped by a driver to change the to select a gear. As shown in FIG. 1, the rotary shift knob assembly 12 is shown with an indicator 15 adjacent the indicia that corresponds to the neutral transmission state. The indicator 15 may be rotated forward or in a clockwise direction to the D or drive indicia. Conversely, the knob 14 may be pivoted rearward or in a counter-clockwise direction by the R indicia to select the reverse position. In FIG. 1, the indicator 15 is adjacent the neutral indicia and the knob is axially shifted to the left. In the axially shifted position, the knob 14 is pressed toward the left side of the Figure and is in the park position. In FIG. 2, the knob 14 is moved axially to the right and the gear selector is in neutral.

Figure 3:
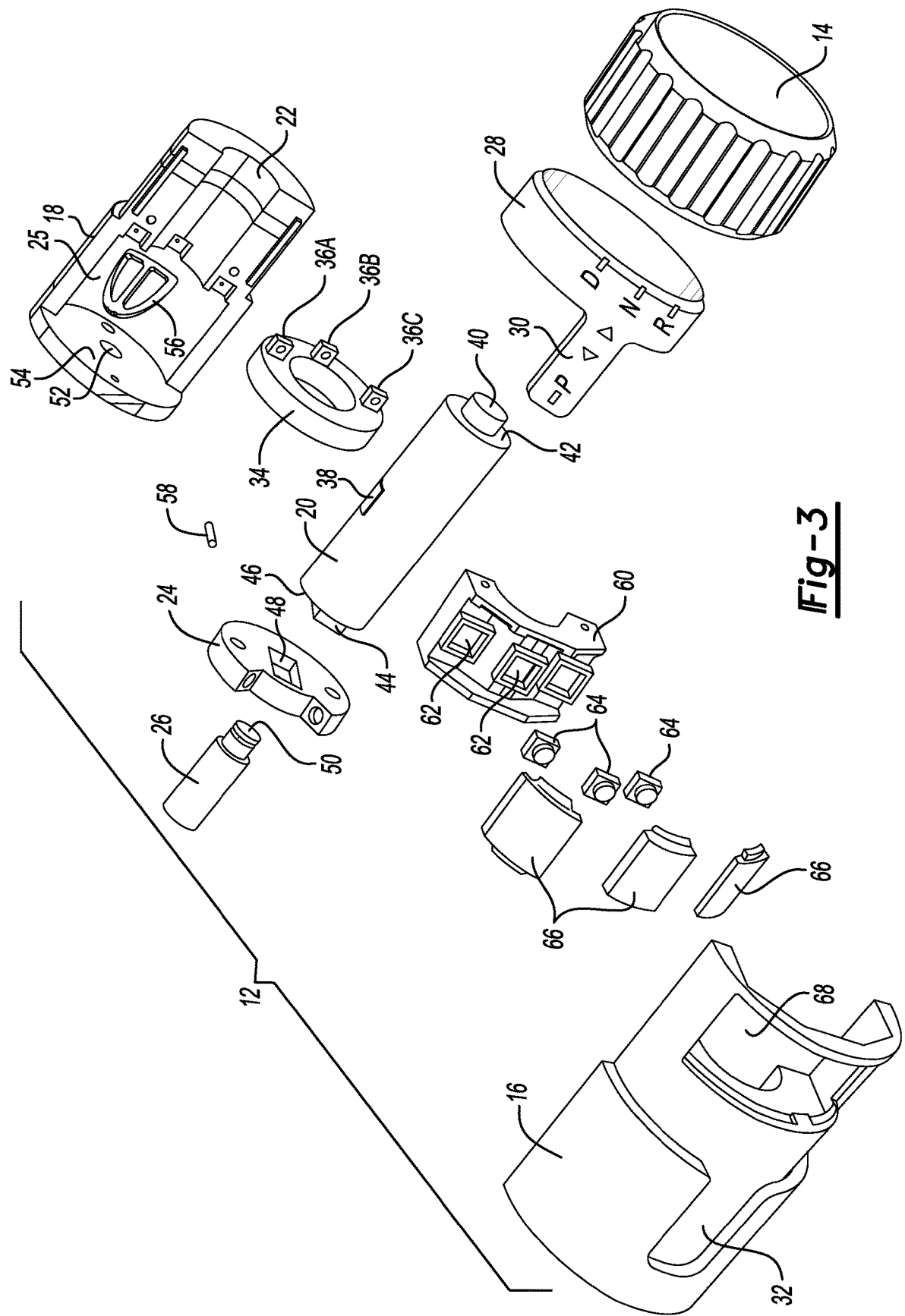
FIG. 3 is an exploded perspective view of the rotary shift knob of the embodiment of FIG. 1.

Referring to FIG. 3, a rotary shift knob assembly 12 is shown to include the knob 14 and a first housing part 16 and a second housing part 18. A shaft 20 is assembled into an axial bore 22. The axial bore 22 is partially defined by the first housing part 16 and partially defined by the second part 18. The shaft 20 is connected to a piston 24. The piston 24 is moved by manipulating the knob 14 and may be moved pivotally and axially. Movement of the knob pivotally or axially is communicated through the shaft 20 to the piston 24. The piston 24 is disposed within a cavity 25 that is defined by the first and second housing parts 16 and 18.

The rotary shift knob assembly 12 is attached to the second housing part 18 in a fixed relationship.

An indicia ring 28 is assembled over the first and second housing part 16 and 17 and includes an axially extending portion 30. The indicia ring includes the letters D, N, R and P that correspond to the transmission selector positions drive, neutral, reverse and park.

A switch contact ring 34 is assembled inside the first and second housing parts 16 and 17 in a fixed relationship while the shaft 20 is pivotally and axially moveable relative to the switch contact ring 34.

The switch contact ring 34 includes a plurality of switch contacts 36A-36C that are contacted or otherwise actuated by a switch actuator 38 provided on the shaft 20. The switch actuator 38 may be a ferromagnetic portion of the shaft 20 that closes micro switch contacts that are magnetically attracted to the ferromagnetic portion comprising the switch actuator 38.

A knob connector 40 is provided on a distal end 42 of the shaft 20. The knob connector 40 is fixedly attached to the knob 14 by a fastener, an adhesive or other permanent connection mechanism. A piston connector 44 is provided on the inner end 46 of the shaft 20 that is adapted to be received in a rectangular opening 48 provided in the piston 24.

A stalk connector 50 is provided on the distal end of the stalk 26 and is adapted to be received in an opening 52 provided in an inner end wall 54 of the second housing part 18.

A guide track 56 is provided as a groove or recess in a wall of the second housing part 18 that defines the cavity 25. A follower 58 is assembled to the piston 24 and is adapted to follow the guide track 56. The follower 58 and guide track 56 limit the axial and pivotal movement of the piston 24. The guide track includes tracks that extend from the park position in the portion of the guide track 56 closest to the inner end wall 54 of the second housing part 18. The lower-most track allows the piston to move between drive and park; the center track allows the piston to move between park and neutral; and the upper-most track allows the shifter to be moved between reverse and park. The vertical track of the guide track extends between the park, neutral and reverse and allows shifting from park through neutral to reverse and vice versa with the knob 14 being shifted axially away from the steering column.

Referring to FIG. 5, the rotary shift knob assembly 12 is shown partially assembled and partially exploded. The stalk 26 is shown with the stalk connector 50 separated from the stalk receiving opening 52. The first housing part 16 is shown to include the recess 32. The knob 14 and indicia ring 28 including the axially extending portion 30 are shown separated from the rotary shift knob assembly 12. The knob connector 40 provided on the shaft 20 at the distal end 42 of the shaft 20 is shown in FIG. 5 in position to be attached to the recess 70 inside the knob 14.

Referring to FIGS. 4 and 5, a manual shift switch retainer 60 is shown to include a plurality switch receptacles 62 that are adapted to receive a plurality of micro switches 64. Each switch receptacle 62 is adapted to receive one micro switch 64. A plurality of push buttons 66 are operatively connected to the first housing part 16. The push buttons 66 are accessible only when the knob 14 (shown in FIG. 5) is moved out of park axially toward the distal end of the rotary shift knob assembly 12. The manual shift switch retainer 60 and the push buttons 66 are used to manually change the gear ratio selected for the transmission (not shown).

Referring to FIGS. 6A-6D, an alternative embodiment of a rotary shift knob 80 is illustrated in four different positions. The rotary shift knob 80 includes an inner member 82 that telescopically receives an outer member 84. A follower 86 is attached to the inner member 82 and guide 88 is provided on the outer member 84. Position indicia 90 is provided in the form of the letters PRND on the outer member 84. The outer member 84 also includes a plurality of ribs 92. The ribs 92 are provided to facilitate grasping the shift knob 80 and moving it as shown in the sequence of drawings FIGS. 6A-6D.

Figure 6A:
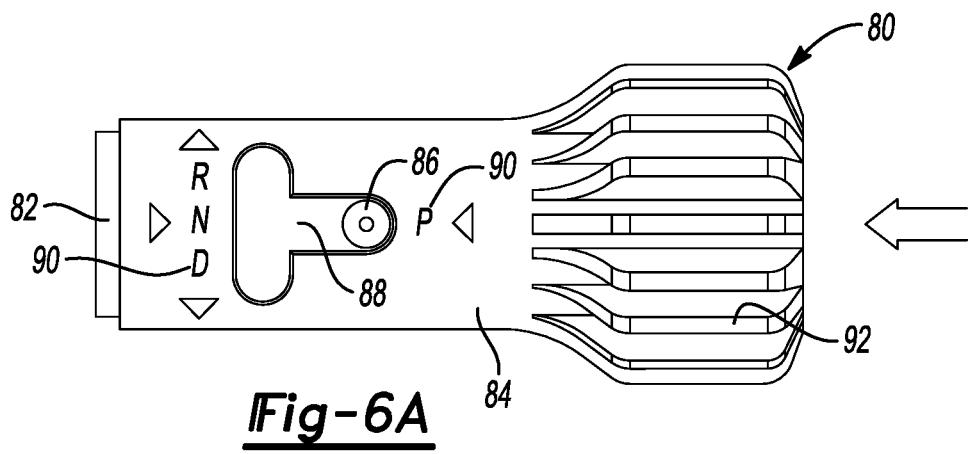
FIG. 6A-6D illustrate a series of elevation views of an alternative embodiment of a rotary shift knob.

In FIG. 6A, the follower 86 is disposed in the guide adjacent the indicia P. In this position, the shift knob 80 is axially shifted to the left as indicated by the arrow on the right side of FIG. 6A and the outer member 84 is telescopically received over the inner member 82.

Figure 6B:
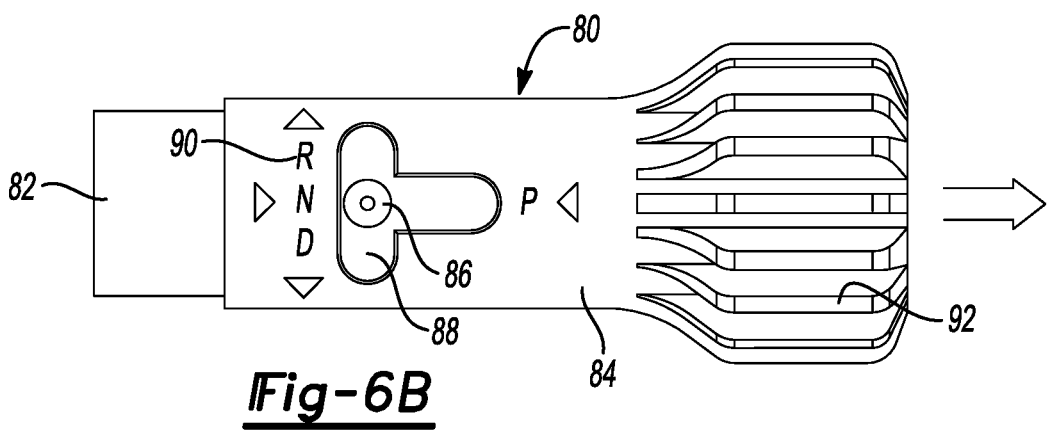

In FIG. 6B, the follower 86 is shown disposed adjacent the N position indicia 90 and the transmission is in its neutral state. The shift knob 80 is axially shifted to the right as indicated by the arrow on the right side of FIG. 6B.

Figure 6C:
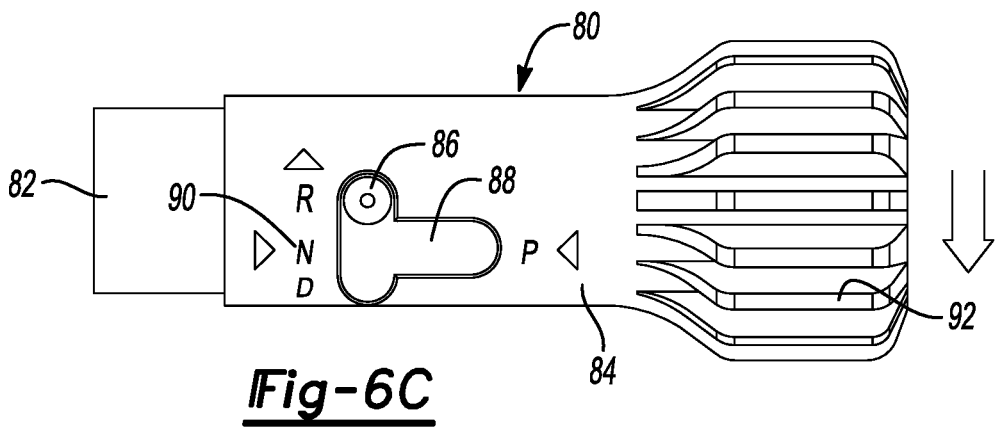

In FIG. 6C, the follower 86 is disposed in the upper end adjacent the position indicia 90 "R" indicating that the transmission has been instructed by the selector to shift into reverse. The arrow on the right of the shift know 80 indicates that the knob is rotated counter-clockwise to shift from neutral into the reverse position.

Figure 6D:
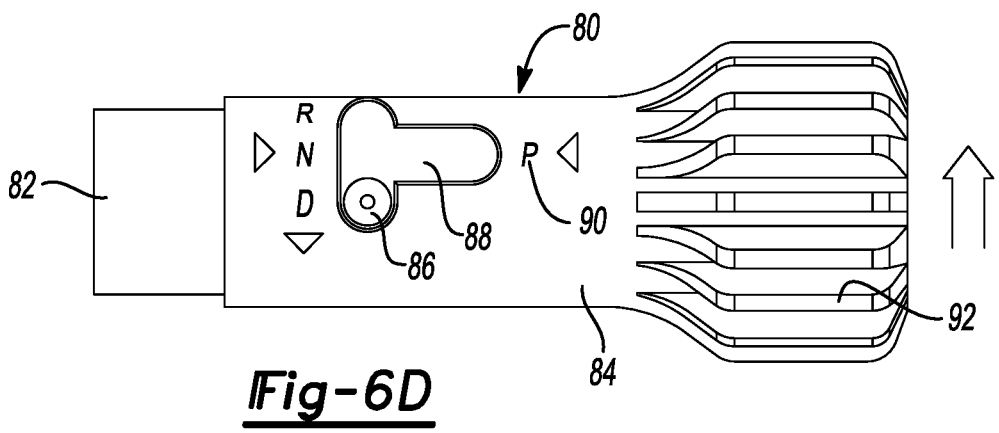

Referring to FIG. 6D, the rotary shift knob 80 is shown with the follower 86 being disposed within the guide 88 adjacent the "D" position indicia 90. The arrow on the right side of FIG. 6D indicates that the knob is rotated clockwise to shift from reverse or neutral into drive.

The guide 88 limits movement of the shift knob pivotally between the reverse, neutral and drive positions. This arrangement provides an advantage of reducing the chance of shifting into park inadvertently as the knob is rotated between the reverse, neutral and drive positions.

The rotary shift knob is intended to be used with "shift-by-wire" transmission shifting mechanism and electrical contacts of micro switches would be provided similar to those shown in the embodiment of FIG. 1-5 between the inner member 82 and outer member 84. The contacts are closed one at a time as the knob is moved between park, reverse, neutral and drive.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

We claim:

1. A shift knob assembly comprising:
   a knob connected to a piston by a shaft;
   a housing defining a cavity that receives the piston and a bore that receives the shaft;
   a guide and a follower provided on one of the piston and cavity to control movement of the piston, wherein the knob moves the piston axially in a first direction to shift into a park position, and the knob is pivoted to shift between reverse, neutral and drive positions; and
   a manual shift switch retainer provided on the housing is adapted to receive a plurality of micro switches and push buttons operatively connected to the micro switches for manually shifting between different drive gear ratios by contacting one of a plurality of micro switches, wherein the push buttons are enclosed by the knob in an automatic mode and the push buttons are selectively accessible when the knob is moved axially in a second direction opposite the first direction.

2. The shift knob assembly of claim 1 wherein the follower is provided on one of the piston and cavity; and the guide is provided on the other of the piston and cavity that is engaged by the follower to limit radial and axial movement of the inner and outer members relative to each other.

3. A shifter comprising:
   a body defining an internal cavity and an axial opening extending from the internal cavity to one side of the body;
   a knob assembly including a handle and a piston connected by a shaft, wherein the piston is disposed inside the internal cavity, the shaft is disposed in the axial opening, and the handle is disposed outside the body;
   a track and a follower operative to guide movement of the piston assembly relative to the body, wherein the follower moves within the track to pivot about an axis to shift between drive, reverse, and neutral positions and wherein the follower moves axially in a first direction within the track to shift to a park position, and wherein shifting into park is prevented when the follower pivots within the track about the axis; and
   a set of electrical contacts provided on a switch contact ring attached to the body each corresponding to a plurality of shift positions and a contactor operative to change a transmission selection when moved into contact with one of the set of electrical contacts, wherein the set of electrical contacts includes a drive contact, a neutral contact, and a reverse contact, wherein the drive and reverse contacts are circumferentially aligned on the switch contact ring.

4. The shifter of claim 3 wherein the handle is pivoted in one rotary direction to move into drive and in the opposite rotary direction to move into reverse.

5. The shifter of claim 3 wherein the handle is moved toward the body in the first axial direction to move into park.

6. The shifter of claim 3 further comprising:
   a manual shift switch disposed on a manual shift switch retainer, wherein the manual shift switch is covered by the handle when the handle is in an automatic shift mode, and the manual shift switch is accessible in a manual shift mode when the handle is moved axially away from the body.

7. The shifter of claim 3 wherein the body includes a first housing part and a second housing part.

8. The shifter of claim 7 further comprising: an indicia ring assembled over the first housing part and the second housing part.

* * * * *